Sept. 25, 1951                A. SMET                2,569,199
METHOD AND APPARATUS FOR CONTACTING SOLIDS AND LIQUIDS
Filed July 13, 1948                          3 Sheets-Sheet 1
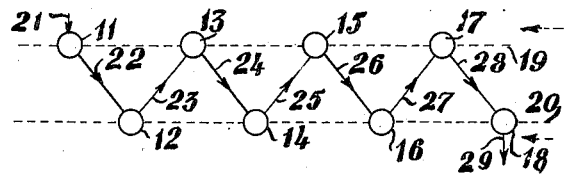
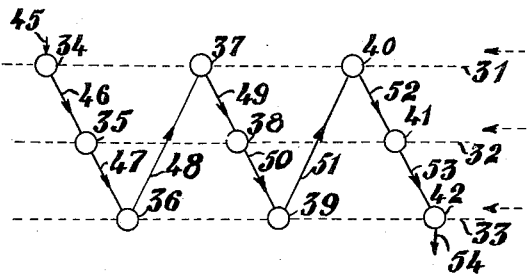
INVENTOR.
BY André Smet,
Karl Michaelis
Attorney INVENTOR.
André Smet
BY
Karl Michaelis
Attorney Sept. 25, 1951 A. SMET 2,569,199
METHOD AND APPARATUS FOR CONTACTING SOLIDS AND LIQUIDS
Filed July 13, 1948 3 Sheets-Sheet 3
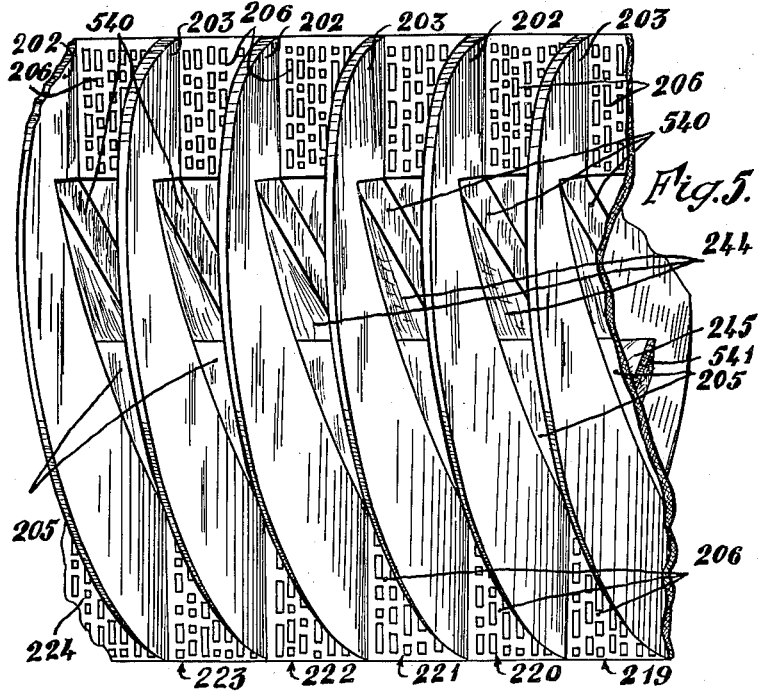
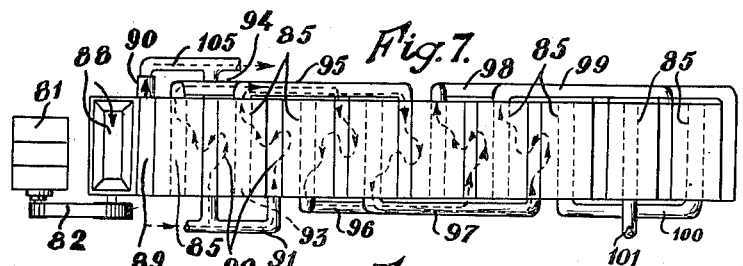
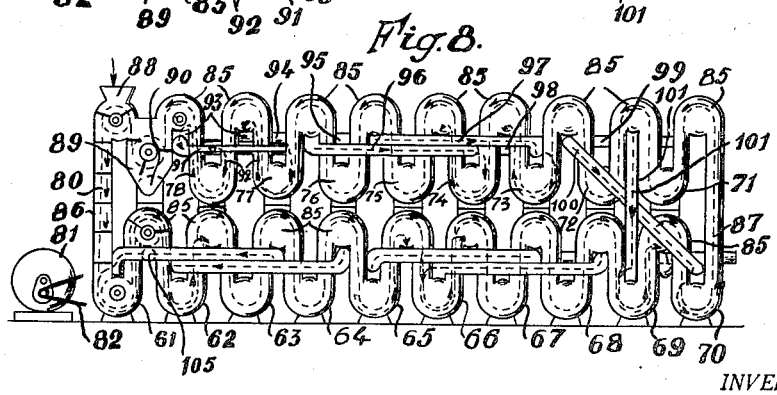
INVENTOR.
André Smet,
BY
Karl Michaelis
Attorney

Patented Sept. 25, 1951

2,569,199

UNITED STATES PATENT OFFICE 2,569,199

METHOD AND APPARATUS FOR CONTACTING SOLIDS AND LIQUIDS

André Smet, Tirlemont, Belgium, assignor to Raffinerie Tirlemontoise, Tirlemont, Belgium, a company of Belgium Application July 13, 1948, Serial No. 38,496

8 Claims. (Cl. 127—5)

This invention relates to a method and to apparatus for contacting solids with a liquid. It is more particularly concerned with the contacting of solids traveling in one general direction with a liquid flowing in the opposite direction. Such contacting is required, for example, in the extraction by means of a liquid solvent of products incorporated in solid materials, the washing or coating of solids with a liquid, the chemical treatment of solids with a liquid or vice versa, etc. A specific application of this invention consists in the continuous diffusion or systematic extraction of sugar from sugar beet cossettes by contacting the cossettes with an aqueous solution.

Hitherto, in contacting processes applied to sugar beet diffusion, the liquid traveled through the contacting apparatus approximately in the same length of time as the solids. In Europe this period varied between about 75 and 90 minutes. However, since the juice or liquid, containing sugar from the sugar beets is liable to ferment thereby causing a loss of the sugar, it is desirable to decrease as much as possible the time during which the liquid is in contact with the cossettes. This has been accomplished in America by decreasing the time of treatment of the cossettes and increasing the amount of liquid contacting them per unit of time to such an extent that the time of contact between the liquid and the cossettes is reduced to about 45 minutes. However, this advantage is obtained at the expense of the far greater amount of heat required to concentrate the resulting greater volume of sugar solution by evaporation. The problem, therefore, to decrease the time of contact of the sugar containing liquid with the cossettes without undue increase in the amount of liquid while nevertheless extracting all the sugar from the cossettes remained unsolved.

It is an object of this invention to provide a contacting method in which the volume of liquid required is not increased unduly, while the period of time within which the liquid stays in contact with the cossettes is shortened considerably without lowering the degree of sugar extraction.

It is another object to provide a continuous and systematic extraction process for the diffusion of sugar beets, and for other purposes, in which the losses of sugar are lessened, the purity of the raw juice and the quality of the concentrate obtained therefrom is raised, the percentage of invert sugar in the juice and the sugar losses in the pulp are lower, and less solvent is required for the extraction.

It is still another object of the invention to provide extracting apparatus of greater flexibility and capacity for continuous extraction. These and other objects are attained by:

1. Dividing the volume of liquid designed to travel through the apparatus into two substantially equal parts and passing these parts through the apparatus in two separate streams flowing in the same direction and opposite to the direction of travel of the solids and at twice the speed of a single stream, carrying the same volume of liquid, and 2. By transferring the batches of solids traveling in countercurrent to the liquid alternately first into one liquid stream and then into the other. For the purpose of illustration of this principle, it is easier to consider several fractions of solids . . . D, C, B, A, . . . and several fractions of liquid . . . $a$, $b$, $c$, $d$ . . . moving countercurrently with respect to each other so that a series of contacts (of predetermined duration) and a series of separations are effected between each batch of solids and each stream of liquid.

In the case of a single stream of liquid as hitherto used, the respective positions of different fractions each moving at the same rate and in opposite directions at any intermediate stage of the operation wherein solid fraction "A" is in contact with liquid fraction "$a$," may be represented as follows:

$$\ldots D \ C \ B \ A \ldots$$
$$\uparrow \!\downarrow$$
$$\ldots a \ b \ c \ d \ldots \quad (\mathrm{I})$$

and then each moving one step in the opposite direction the following stage will be:

$$\ldots D \ C \ B \ A \ldots$$
$$\uparrow \!\downarrow$$
$$\ldots a \ b \ c \ d \ldots \quad (\mathrm{II})$$

and so on.

If, in contrast thereto, each fraction of liquid is divided into two equal parts, the fractions . . . $a$, $c$, $e$ . . . belonging to one stream the fractions . . . $b$, $d$, $f$ . . . to the other stream, then the respective positions of these fractions at any intermediate stage are as follows:

$$\ldots D \ C \ B \ A \ldots$$
$$\uparrow \!\downarrow$$
$$\ldots a \ c \ e \ldots$$
$$\ldots b \ d \ f \ldots \quad (\mathrm{III})$$

wherein $a$ and $b$ are the two halves of the original $a$, while $c$ and $d$ are the halves of the original $b$. If now each stream is made to flow at twice the speed as the single stream hitherto used or as the solids the relative position will be:

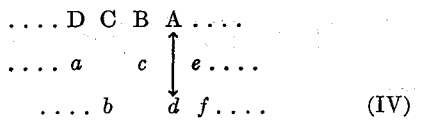

(IV)

and so on.

In the case of a single stream of liquid, the batch A of solids is extracted by liquid fraction $a$ in stage (I) and by liquid fraction $c$ in stage (II).

In the case of two separate streams of liquid, the fraction A after having been extracted with liquid fraction $a$ in stage (III) comes in contact with liquid fraction $d$ in stage (IV) which is much leaner than fraction $c$.

In the case of two separate streams of liquid, the solid fractions at each stage are thus introduced into a solvent fraction which contains a lower concentration of extracting substances than the solvent fractions in the case of a single stream of liquid. There results therefrom an increase in the difference of concentration between solids and liquid which increases the extraction speed which also, as has been proven, more than compensates for the reduction of the time during which the liquid remains in the extraction apparatus.

The same applies to the case of a continuous stream of liquid and fractionated or nonfractionated solids. The liquid and solids can then be considered as being divided into infinitely small fractions.

Thus the preferred form of process according to the invention consists in dividing the liquid into two streams flowing in countercurrent to the travel of the solids and at double the rate of the solids and transferring the solids alternately and successfully into one and the other stream of liquid.

This method may be carried out in several different ways. One such way, for example, may comprise a series of contactor cells in which the solids are conveyed successively through each cell in one direction and the liquid is divided into two streams, each stream passing through alternate cells in the opposite direction to the travel of the solids. Another form of such an apparatus may comprise two interthreaded helical partitions in a rotating horizontal cylinder or drum which form a double screw of the Archimedes type. These helical portions form in the drum two interthreaded canals for the liquid along the periphery of the drum. Means centrally located in the drum may be provided for conveying the solids from one helical canal to the other in the direction opposite to the flow of the liquid between adjoining helical partitions.

Figs. 1 and 2 are flow diagrams illustrating the principle underlying the invention.

Fig. 3 is a sectional elevation of the extreme ends of one form of apparatus for carrying out the invention.

Figure 4:
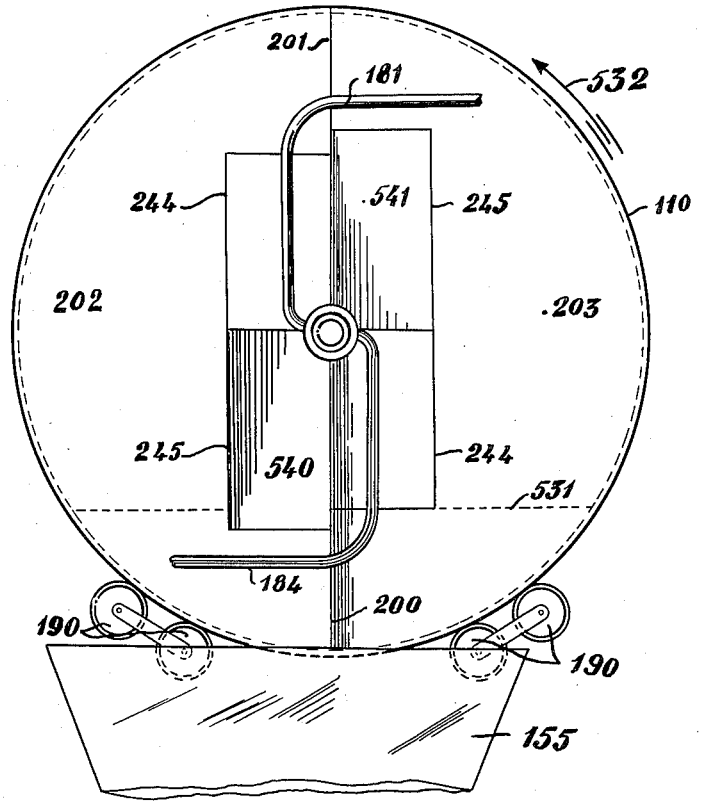

Fig. 4 being an end view of the right hand end, while

Fig. 5 is a perspective view of part of the inner structure.

Figure 6:
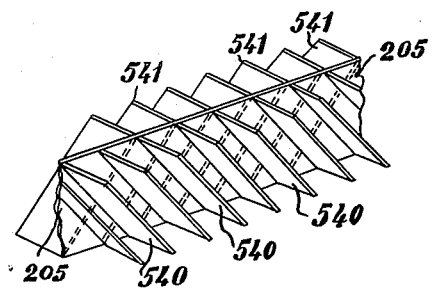

And Fig. 6 is a perspective view of the chute structure.

Figs. 7 and 8 are top and side views respectively drawn to a smaller scale of another type of apparatus for carrying out the invention.

Referring to Fig. 1, the schematic flow sheet indicates two rows of contacting cells (contactors) 11, 13, 15, 17 and 12, 14, 16, 18. As indicated by two dotted lines, the solvent is divided into two separate streams 19 and 20, each of which passes in the direction of the arrows from right to left through the canals or rows of contactors 17, 15, 13, 11, and 18, 16, 14, 12, respectively.

The solids (cosettes) are introduced on the left into contactor 11 at 21 and are made to travel successively back and forth in a zigzag path between the two rows of contactors as indicated by the figures 22, 23, 24, 25, 26, 27 and 28 to be withdrawn at 29 after having passed through each contactor in succession from 11 through 18 and alternately back and forth in a zigzag path from one stream of solvent 19 to the other stream of solvent 20. When fraction A of solids is contacted with solvent fraction $a$ in contactor 11 at one stage, the same fraction A of solids is transferred in the following step to contactor 12 which previously contained fraction $b$ of liquid but now contains fraction $d$. Liquid fraction $d$ is transferred from contactor 14 to contactor 12 at the time the solids A are transferred from contactor 11 to contactor 12 and so on, for each of the other fractions throughout the two series of contactors shown in Fig. 1. Thus, with the liquid solvent being divided into two streams flowing in the same direction, each stream only passes through one-half of the total number of contactors and both streams may pass through the group of contactors, twice as fast as the solids.

Referring to Fig. 2, here a more general schematic flow sheet of the principle of this invention is disclosed, here the solvent is divided into three, instead of two, streams (31, 32 and 33) flowing in the same direction, each of which passes through only one third of the contactors, (40, 37, 34, 41, 38, 35 and 42, 39, 36, respectively). The solids introduced at 45 into contactor 34 pass for the first step through duct 46 into contactor 35 and for the next step through duct 47 into contactor 36, then for the following step through duct 48 to contactor 37 of the first series, and then on through ducts 49, 50, 51, 52 and 53 successively to the last contactors 40, 41, 42, to be withdrawn at 54. In this process, liquid solvent passes through the extractor three times as fast as the solids, and in a similar manner more rapid flow of the solvent may be obtained by increasing the number of streams of the liquid solvent flowing through a battery or group of contactors forming an extractor unit.

The extraction process illustrated diagrammatically by Fig. 1 can for instance be carried through in apparatuses of the helical canal type or the endless cell conveyor type, represented in their most primitive forms in the Patents 2,012,298 and 2,930,131, provided they are modified in accordance with this invention as described farther below.

Referring to Figs. 3 to 6, there is disclosed an embodiment of an apparatus adapted for the carrying out of the new process. The continuous contactor comprises a rotatable drum 110 through which extend two nested or interthreaded substantially helical canals or grooves and a series of separate contacting cells or compartments, along the lower sector of the drum, means being provided for causing the transfer of the solids from one compartment to the other. The beet cossettes are introduced into the left hand end of the drum 110 and removed at the right hand end, while the water solution is introduced at the right hand end of the drum and withdrawn from the left hand end.

The drum 110 is supported on rollers 190.

In Fig. 3, there are shown at the right hand end of the drum 110 the ends 200 and 201 of the two interthreaded helical canals formed inside the drum 110 by the two interthreaded helical partitions 202 and 203, fixed to the inner wall of the drum 110. Diametrically through the center of the drum extends a partition 205 which divides the drum into two half circular sections and on both sides is flanked by grids 206 permitting the liquid to pass through from one side of a partition to the other, while preventing the cossettes from passing through. At the left hand end of the drum, there are provided larger grids 132 and 133 which extend into the enlarged stationary housing 130 beyond the end of the drum, which pick up the cossettes resting on a screen or grid 131 deposited thereon by an inlet pipe 127. These grids 132 and 133 with scraper ends transfer the cossettes into the first compartments in the drum.

The aqueous solution is supplied from a stationary pipe 160 through a rotating head 180 into a pair of rotating pipes 181 and 184. As the drum rotates in the direction of the arrow 532 shown in Fig. 4, the aqueous solution is fed in alternately through the pipes 184 and 181 whenever they are in their lower position each one feeding one of the streams flowing through the drum.

The cells or treating compartments are numbered 210 through 240 inclusive along the lower segment of the drum, in which the aqueous solution forming one of the streams of liquid fills the odd numbered compartments while the liquid from the other stream fills the even numbered compartments. The mixture of liquid and solids in these compartments generally fills the compartments to about the level indicated by dotted line 531. Thus, as the drum rotates through a half turn, the liquid in the compartments moves from right to left a distance equal to the width of one compartment, or in each full turn, a distance equal to the width of two compartments, i. e. from compartment 210 to compartment 212 in accordance with the two helical canals formed inside the drum 110 and carrying the two streams of liquid flowing in the same direction. The fat sugar solution discharged from the last compartment on the left of the drum directly flows through the screen 131 into a tank so that no liquid accumulates in the stationary end housing 130 and will not leak out around the inner annular side of the housing, which eliminates the necessity of having a liquid tight seal between the drum and the liquid discharge means.

The means for transferring the cossettes from one compartment to the other, consist in two series of chutes 540 and 541, one along each side of the partition 205, and directed through openings near the center of each helical partition 202 and 203, connecting adjacent canals in the direction opposite to that of the pitch of the helical partition. At the right hand end of the drum, the chutes 540 and 541 direct the cossettes into a hopper 155. As the drum rotates, the grids 206 retain the cossettes and raise them until the inclination of the plate 205 becomes so great that the cossettes slide down the partition 205, being guided by the chutes 540, 541 toward the right into the adjoining winding of the other canal. These chutes may be formed with side walls 244 and 245 to prevent any of the cossettes from dropping off the chutes 540 and 541 back into the same or into the wrong compartment.

Thus during each complete rotation of the drum, the same grid 206 will pick up the cossettes from one stream in one canal and transfer them into the stream of liquid in the adjoining canal, at the same time the liquid in one compartment has moved the distance of the width of two compartments in the direction opposite to the displacement of the cossettes. The cossettes thus remain in the liquid in each compartment during the period of time it takes the drum to rotate through a half circle and during that time float in the liquid according to the pitch of the helical canal in which the liquid travels. Then during the other half rotation the cossettes are removed or scooped from the liquid in that compartment and transferred into the other stream of liquid. The cossettes are thus transferred alternatively from one liquid stream into the other.

While the apparatus shown in Figs. 3–6 is organized for dividing the solvent into two streams, a three- or four-thread screw fixed in the drum would divide the solvent into three or four streams. Means other than chutes may be employed for transferring the solids from one stream to the other.

In Figs. 7 and 8 I have disclosed an apparatus comprising an extraction battery formed of a series of U-shaped cells 61 through 78 arranged in two tiers through each of which passes one endless conveyer 80 driven by a motor 81. The cells are connected to form a continuous sinusoidal housing which is provided at one end with an open hopper 88 into which the cossettes are introduced, to be then conveyed successively through the cells 61 through 78 and thence into the final pulp discharge chamber 89 and out through duct 90.

The disposition of the U-shaped cells and the means for conveying the cossettes are similar to those shown in the Silver patent mentioned above.

Two equal streams of liquid flowing in countercurrent to the stream of solids and in the same direction are introduced into cells 78 and 77, respectively, through manifold 91 feeding the liquid into ducts located within the U section of these conveyors. So, the liquid streams entering into the downward traveling leg of each U as indicated by the dotted lines 92 (Fig. 7), to pass with the solids on the conveyer through the cells 78 and 77 and out through ducts 93 within the U of the connecting housings 85 into the pipes 94 and 95 (Fig. 8) which then conduct the liquid into the central portion of U-shaped cells 76 and 75, respectively. From these cells 76 and 75 the liquid flows through pipes 96 and 97 into cells 74 and 73, thence through pipes 98 and 99 to cells 72 and 71, from cells 72 and 71 through downwardly extending pipes 100 and 101 to cells 70 and 69 on the lower tier, and so on to the outlets of cells 61 and 62 into the liquid discharge manifold 105.

The mixture of liquids and solids travelling through any given cell forms a substantially integral fluid mass which under the impelling influence of the endless conveyer acts like a piston in a cylinder to raise the excess liquid to a higher level than its level in the down side of such cell, so that the liquid will readily escape from the ducts 93. Each of the discharge openings for the liquid within the U of housings 85 may be provided with a screen or grid to prevent the solids moved by the endless conveyer from following the liquid through connecting pipes 94 and 101, etc.

Thus, in this system the solids are alternately contacted with two streams of liquid flowing in a direction opposite to that of the moving solids and passing through two interthreaded series of cells; viz. the even numbered cells 78, 76, 74, 72 etc. and odd numbered cells 77, 75, 73, 71 etc.

The following specific examples illustrate the advantages of this invention when applied to the diffusion or extraction of sugar beet cossettes with a water solvent:

Thick cossettes cut by Göller knives of 7.2 x 5 mm., 4.25 mm. high and having 7 mm. openings, were treated in continuous drum diffusers at a temperature between about 72° and 75° C. and at a pH not less than 5.7. The following average comparative results were obtained between an apparatus for diffusion as described in the Bergé patent (Example I), and an apparatus of the same dimension for diffusion according to this invention (Examples II and III):

| Examples | I | II | III |
|---|---|---|---|
| Liquid solvent draft, in liters | 108.3 | 120.1 | 107.9 |
| Speed of drum, in revolutions per hour | 21.7 | 24.5 | 21.2 |
| Load per compartment, in Kilograms | 790 | 1,022 | 1,048 |
| 24 hour day production capacity, in metric tons | 412 | 602 | 533 |
| Per cent total losses | .36 | .245 | .26 |

A good comparison between Bergés continuous diffuser of Example I and the continuous diffuser shown in Figs. 3 to 6 can be obtained by comparing the results of Example I with those of Example III, which shows a 30% increase in the capacity of the apparatus and a corresponding decrease in the total losses. The increase is due to the fact that each compartment contains less liquid permitting a greater amount of cossettes to be introduced into each compartment to obtain the same liquid-solids mixture level in the drum. And since less liquid is present, less filtering time is required to drain the cossettes scooped from the compartments, which permits an increase in the speed of rotation of the drum.

A comparison of the continuous diffuser of the type shown in Figs. 3 to 6 (Example V), with the old stationary batteries containing a group of separate tank diffusers each of 100 hl. capacity (Example IV), is shown in the following table:

| Example | IV | V |
|---|---|---|
| Speed per hour | 10 diffusers | 23.1 rev. per hour. |
| Length of time of diffusion for cossettes | 78 minutes | 80 minutes. |
| Length of time of stay of juice in the diffusers | 78 minutes | 40 minutes. |
| Draft, in liters | 116.5 | 118.2. |
| Total losses | 0.34% | 0.24%. |
| Waste waters | Recovered | Not recovered. |
| Invert sugar, per cent Brix | 0.90 | 0.67. |
| Purity of juice | 86.0% | 86.5%. |

Comparison of Examples IV and V shows a higher purity for the juice, a lower invert sugar content, and smaller losses for the continuous process in spite of the fact that the time of stay of the juice in the drum was only half that of the time for the batteries.

Although the above examples are limited to the diffusion of sugar beets, the principles of this invention are applicable to any process wherein solids are to be treated, extracted, coated, washed, etc. by repeatedly contacting the solids with separate fractions of a liquid or solvent solution.

While I have described hereabove the principles underlying this invention in their application to specific apparatus, I wish it to be understood that this description is only intended as an example and that I also do not wish the protection offered by the patent to be granted to be limited to the details shown and described, for obvious modifications will occur to a person skilled in the art.

I claim:

1. The method of continuously contacting solids traveling through a contact zone with a volume of liquid sufficient for an effective contact, which comprises dividing said volume of liquid into at least two substantially equal parts, passing said parts through said zone in at least two streams traveling in countercurrent to and at greater speed than said solids and bringing said solids during their passage through said zone repeatedly into contact with each one of said streams.

2. The method of extracting soluble matter from solids traveling through a contact zone, which comprises dividing a volume of liquid solvent sufficient for a satisfactory extraction into at least two parts, passing said parts of solvent liquid through said zone in at least two streams flowing at a speed greater than that of said solids and alternately and repeatedly immersing said solids into each one of said streams.

3. The method of extracting the sugar from cossettes, which comprises forcing the cossettes to travel through an extraction zone of predetermined length within a predetermined period of time in a path materially longer than said zone, passing a volume of water sufficient for a satisfactory extraction of the sugar from the cossettes simultaneously, but in countercurrent to said cossettes, in two separated substantially straight-line streams through said zone from end to end, directing said cossettes repeatedly into, and out of, each one of said streams and so timing the feed and speed of flow of said streams that the passage of said volume of water through said zone takes substantially not more than half the time of the passage of said cossettes.

4. The method of extracting the sugar from cossettes, which comprises passing through a horizontally extending extraction zone in two substantially straight and parallel streams a volume of water sufficient for extracting a satisfactory percentage of sugar from a quantum of about an equal total weight of cossettes and simultaneously conducting the said quantum of cossettes in a zigzag path intersecting said streams through said zone in countercurrent to said streams in such manner as to alternately and repeatedly immerse said cossettes in, and lift them from, one and the other stream.

5. Apparatus for contacting solids with a liquid, comprising in combination, a plurality of means each for continuously conveying a liquid stream in one direction, means for feeding solids in the opposite direction to said streams and through a contact zone and means for moving said solids repeatedly and alternately into contact with each one of said streams.

6. Apparatus for contacting solids with a liquid comprising in combination, a plurality of contact cells arranged in series, means for continuously feeding through said series of cells at least two concurrent substantially parallel liquid streams, means for continuously conveying solids to a cell receiving one of said liquid streams and means to move said solids from said last-mentioned cell to a second cell receiving another of said liquid streams while advancing said solids counter to the direction of flow of said liquid streams.

7. Continuously operating apparatus for contacting solids with a liquid comprising in combination, a horizontally revolvable drum, a plurality of separate substantially parallel interthreaded means forming spiral canals extending axially from one to the other end of said drum, means for feeding liquid into adjacent ends of said canals, separating means in said drum movable to separate solids from liquid and means to convey said solids from one to the other end of said drum in counterflow to said liquid and in a zigzag path intersecting all said canals.

8. Continuously operating apparatus for contacting solids with a liquid, comprising in combination, a horizontally revolvable drum, a plurality of substantially parallel interthreaded spiral walls extending in relatively spaced relation coaxially with said drum from one to the other end of said drum, said walls being tightly joined to the inner drum wall and being inferior in height to the drum radius, a plurality of radially and axially extending openwork partitions subdividing the helical spaces between said spiral walls into cells open towards the common center and means extending across at least one winding of said helical walls for guiding solids lifted into the upper half of said drum so as to make said solids drop across said walls into another helical space.

ANDRÉ SMET.

REFERENCES CITED

The following references are of record in the file of this patent:

UNITED STATES PATENTS

| Number | Name | Date |
|---|---|---|
| 1,286,066 | Naudet | Nov. 26, 1918 |
| 2,012,298 | Bergé | Aug. 27, 1935 |
| 2,390,131 | Silver | Dec. 4, 1945 |
| 2,466,259 | Morton | Apr. 5, 1949 |

FOREIGN PATENTS

| Number | Country | Date |
|---|---|---|
| 358,837 | Great Britain | Oct. 15, 1931 |
| 392,323 | France | Sept. 22, 1908 |

OTHER REFERENCES

Heriot, "Mfg. of Sugar—Cane and Beet," London, 1920, p. 98.